United States Patent [19]
Ferriss et al.

[11] 3,951,000
[45] Apr. 20, 1976

[54] ELECTROSTATIC MOTOR

[75] Inventors: Lincoln S. Ferriss, Madison; Robert M. Hohenstein, Glen Ridge, both of N.J.

[73] Assignee: The Singer Company, Little Falls, N.J.

[22] Filed: Apr. 4, 1974

[21] Appl. No.: 458,005

[52] U.S. Cl. .................... 74/5.6 D; 310/5; 318/116
[51] Int. Cl.² .......................... G01C 19/28
[58] Field of Search .......... 310/5, 6; 318/116; 74/5.6 A, 5.6 D, 5.7

[56] References Cited
UNITED STATES PATENTS

| | | | |
|---|---|---|---|
| 735,621 | 8/1903 | Thomson | 318/116 |
| 3,320,817 | 5/1967 | Iddings | 74/5.6 D |
| 3,414,742 | 12/1968 | Fisher et al. | 310/5 |
| 3,451,274 | 6/1969 | Davies et al. | 74/5.7 X |
| 3,482,455 | 12/1969 | Boltinghouse | 74/5.6 D |
| 3,603,161 | 9/1971 | Schwarz | 74/5.7 |

*Primary Examiner*—Charles J. Myhre
*Assistant Examiner*—William C. Anderson
*Attorney, Agent, or Firm*—T. W. Kennedy

[57] ABSTRACT

An electrostatic motor which is well suited for an electrostatic gyro rotor spin up, spin down system which provides positive starting at any rotor position, choice of clock-wise or counter-clockwise rotation, spin up and spin down modes with automatic coast and stop modes, choice of full speed along with having zero induced rotor voltage and non-displacemental force generation is shown.

15 Claims, 8 Drawing Figures

"POCKETS" MACHINED IN OUTER SURFACE OF ROTOR PROVIDE CAPACITANCE GRADIENT $T = \dfrac{NKE_o RBV^2}{2G}$ B = WIDTH
N = NUMBER OF ACTIVE ELECTRODES
V = POTENTIAL ACROSS CAP C
T = ROTATIONAL TORQUE

ELECTROSTATIC MOTOR

BACKGROUND OF THE INVENTION

Electrostatic gyros have been developed in which the gyroscopic element is suspended or captured by electrostatic forces. With such gyros a motor which provides for the gyro rotor spin up and spin down is required. Although any type motor may be used, such as a magnetic eddy current motor, it is thought that electrostatic motors may be preferable for this purpose. Various such motors have been developed, each of which suffer from at least some deficiencies. These deficiencies can best be pointed out by describing the requirements of an ideal electrostatic motor for such use. Such a motor should be non-ambiguous, i.e., it should provide positive starting torque for all rotor positions relative to the stator. In addition, it should be able to provide either clockwise or counter-clockwise rotation which can be simply selected. Furthermore, it should have both spin up and spin down capabilities which similarly, are easily selected. Furthermore, it should have the feature of going into a coast mode automatically when the desired rotor angular rate is achieved. It should also automatically enter a stop mode when the relative angular rate between the rotor and stator reaches zero. In addition, it should have an induced voltage on the rotor which is zero with the rotor arranged such that no conductive connections thereto are required. And finally, it should have zero displacement forces and moments applied thereto, except for the desired moment about the polar axis. Up to the present time, no electrostatic gyro motor has provided all of these features.

SUMMARY OF THE INVENTION

The present invention provides an electrostatic motor for use in electrostatic gyro rotor spin up and spin down control means which exhibits all the above noted features associated with an ideal electrostatic gyro motor. The rotor comprises n plated segments separated from each other but electrically coupled together by an annular ring. The stator comprises m closely spaced plated electrodes to which voltages are applied by a logic system to achieve all required functions. In order to keep the induced voltage on the rotor zero and to maintain zero displacement forces and moments thereon, the stator has placed thereon, voltages which are equal but opposite at alternate segments. Electro-optical pick-offs are provided which sense the rotor position with respect to the stator and through a series of logic circuits activate the proper pairs of stator electrodes to provide nonambiguous torque for all relative rotor positions. These same logic circuits are designated so that clockwise or counterclockwise rotation may be easily selected and likewise so that the motor has both a spin up and spin down capability.

In the preferred embodiment, means are provided to compare the frequency output of the electro optical pick-offs with a preselected frequency which represents the desired rotor angular rate. The same logic circuits used in properly activating the sensors are then controlled in response to outputs from the frequency comparator to cause the stator to be energized for periods which are sufficient only to maintain the desired angular rate. That is, a coast mode is automatically entered when the desired angular rate is achieved. Other logic circuits are provided to detect the point at which a relative angular rate between the rotor and stator which is near zero is reached and in response thereto, to disable the logic and driving circuits, causing the motor to stop.

DETAILED DESCRIPTION OF THE PREFERRED EMBODIMENT

Figure 1:
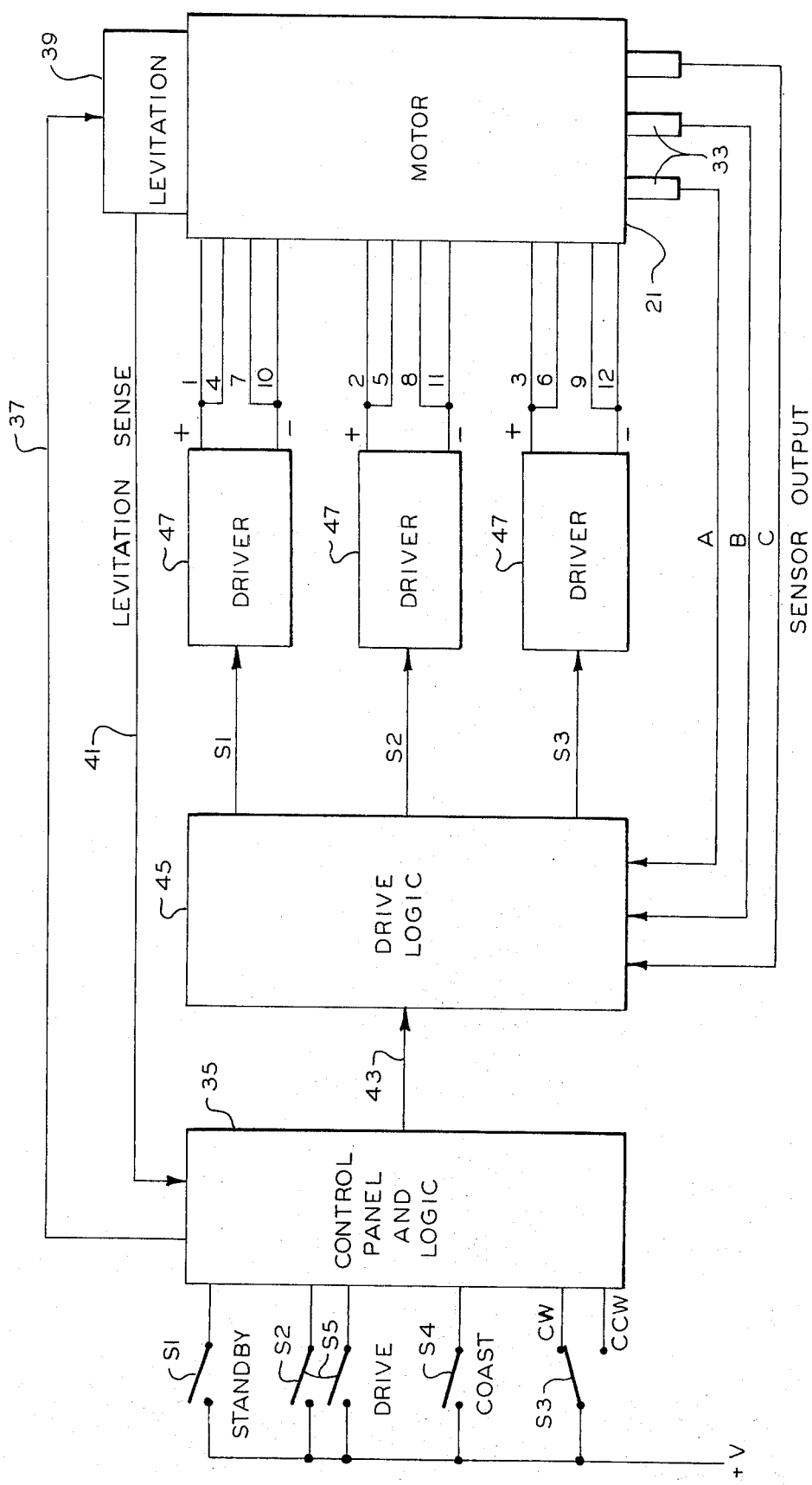
FIG. 1 is an overall block diagram of the electrostatic motor and electrostatic motor control system of the present invention.

The system of the present invention is illustrated by FIG. 1. The motor 21 comprises a segmented rotor 20 and segmented stator 22, as is more clearly illustrated by FIGS. 2 and 3. In general terms, the rotor will be made up of n segments and the stator of m segments. For purposes of illustration, the remainder of the description will deal with an eight-segment rotor and twelve segment stator.

Figure 2A:
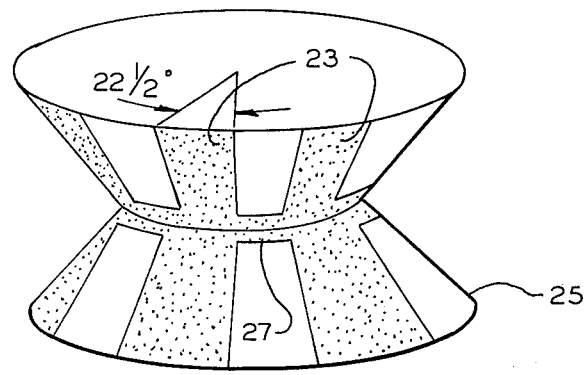
FIG. 2a is a perspective view of a first embodiment of the rotor of the electrostatic motor of the present invention.

As shown on FIG. 2a, the rotor may comprise conductive segments 23 which are plated areas on conical member 25 of ceramic or other non-conductive material, for example. Each subtends an angle of 360°/2n of 22.5°. Electrically connecting all electrode segments 23 is a plated conductive annular ring 27.

Figure 2B:
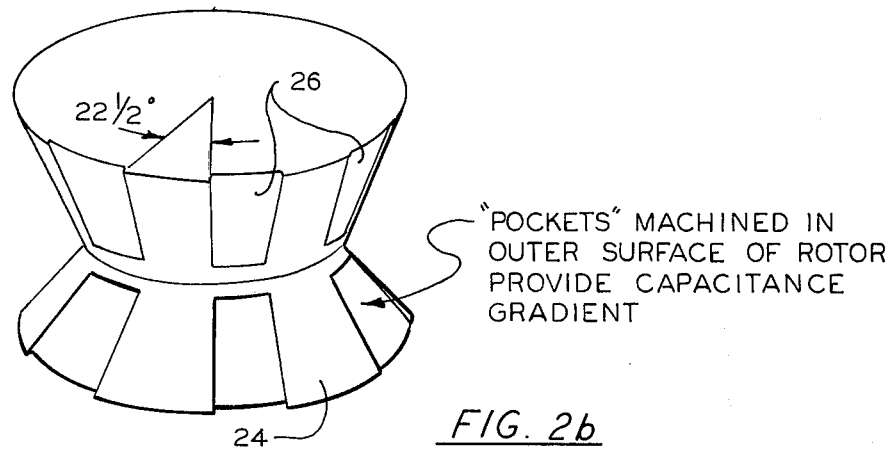
FIG. 2b is a perspective view of a second embodiment of the rotor of the electrostatic motor of the present invention.

A second embodiment of the rotor is shown on FIG. 2b. Here the rotor is made of a conductive material 24 and pockets 26 formed therein to provide a capacitive gradient i.e. depressions are machined into the outer surface of the rotor.

Figure 3:
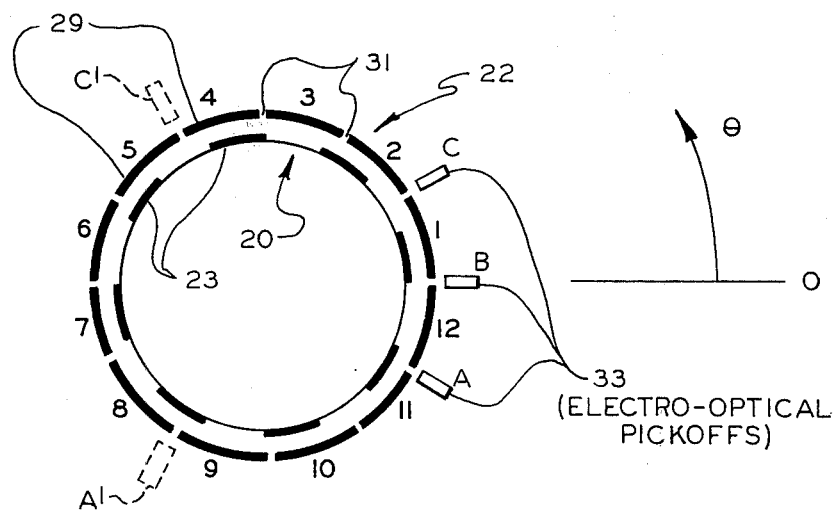
FIG. 3 is a plan view partially in cross section illustrating the relationship between the stator and rotor segments and also showing the electro-optical pickoffs.

The relationship of the rotor 20 to the stator 22 and the segmentation of the latter is shown on FIG. 3. In the example, the stator is made up of twelve segments 29, each subtending slightly less than 360°/m or 30° to leave small gaps 31 between segments. Again, the stator may comprise plated segments or electrodes on a base of ceramic or other electrically non-conductive material. Also shown on FIG. 3 are three electro-optical pickoffs or sensors 33 having output signals designated A, B and C. These are arranged at three adjacent gaps 31 and can be used to sense position by sensing the presence or absence of shiny plated electrode 23. It will be recognized that they may be arranged in other positions, as long as they provide the below described signals, i.e., if the sensor C was moved counter-clockwise, three gaps to position C' and sensor A, three gaps clockwise to A' identical signals will result. The stator electrodes 29 are labelled 1 through 12. In the reference position shown, the rotor has segments 23 extending from 0 to 22 ½°, 45 to 67 ½°, and so on.

The electro-optical pickoffs 33 each provide a logic output (high=1) when reflection is obtained from a plated segment 23 of the rotor. Thus, at the reference position, A=1, B=indeterminate, C=0 B is indeterminate because it is uncertain whether or not a reflection is obtained due to the position of the edge of the segment. With this arrangement, one pickoff changes state each 7 ½° of relative rotor displacement. The progression of logic states of the pickoffs follows a Grey code (no simultaneous logic state changes) which repeats every forty-five degrees of rotation. For example, in Table I, a counterclockwise rotor rotation is assumed and logic states of the pickoffs are entered.

Table I

| Angular Displacement, Deg. | Pickoff Logic States A B C |
|---|---|
| 0 | 100 |
| 7 ½ | 101 |
| 15 | 001 |
| 22 ½ | 011 |
| 30 | 010 |
| 37 ½ | 110 |
| 45 | 100 |
| 52 ½ | 101 |
| (CCW Rotation) | |

Assume CCW rotation is desired and the rotor is displaced angularly just beyond 0°, as shown in FIG. 3. Activation of electrodes 3, 6, 9, and 12 produce additive CCW tangential components and cancelling radial components. Moreover, by polarizing pairs of active electrodes, positive and negative, the zero rotor voltage property is obtained.

As the rotor passes 15°, electrodes 2, 5, 8 and 11 are active; and at 30°, 1, 4, 7 and 10 are active. The sequence repeats at 45°.

Now, the activity of the sets of electrodes can be identified by assignment as in Table II.

Table II

| Electrodes Active (2 Pos., 2 Neg.) | Logic Symbol Assigned |
|---|---|
| 1, 4, 7, 10 | S1 |
| 2, 5, 8, 11 | S2 |
| 3, 6, 9, 12 | S3 |

Two more assignments can be made to indicate spin-up or spin-down and direction. For CCW rotation, W=1 (for CW rotation W=0); for spin-up, U=1. (For spin down U=0)

By examination of FIG. 3 for the four combinations of CCW spin-up, CCW spin-down, CW spin-up and CW spin-down, the combinational logic equations for S1, S2 and S3 can be obtained, and are as follows:

$$S1 = (WU+\overline{WU}) \cdot B\overline{C} + W\overline{U} \cdot \overline{A}C + \overline{W}U \cdot A\overline{B}$$
$$S2 = (WU+\overline{WU}) \cdot A\overline{C} + W\overline{U} \cdot A\overline{B} + \overline{W}U \cdot B\overline{C}$$
$$S3 = (WU+\overline{WU}) \cdot A\overline{B} + W\overline{U} \cdot B\overline{C} + \overline{W}U \cdot AC$$

The remainder of FIG. 1 illustrates the major elements used to obtain operation in accordance with the above. A control panel 35 contains switches and indicator some of which are shown, along with control logic to be described below. Operation is initiated by closing the standby switch and then the levitation switches. The latter will cause an output which will be provided on line 37 to a levitation system 39 which will levitate the rotor in motor 21 in conventional fashion. When such occurs, an output on line 41 will be provided back to the logic in block 35.

The drive switch S2 may then be operated with direction of rotation selected by CW-CCW switch S3. This will provide appropriate outputs over line 43 to the drive logic 45. Here inputs from block 35 will be combined with the A, B and C outputs of electro-optical pickoff 33 to develop the signals S1, S2, and S3 according to the above equations and tables. These outputs are then provided to drivers 47 which sequentially provide energizing voltages of opposite polarity to pairs of stator segments according to the above above.

Once operating and up to speed, means in logic 45 insure that proper speed is just maintained by comparing the outputs of sensors 33 with a predetermined reference frequency.

If it is desired to stop the motor, it may either be allowed to coast down or be driven down. Operation of the coast switch S4 will cause an output to logic 45 inhibiting the outputs S1, S2 and S3 and the motor will coast to a stop. To drive the motor down, the switch S3 is switched to the opposite position. This will reverse the drive. Means are provided to detect, from the outputs A, B and C, a stop condition and to inhibit the S1, S2 and S3 outputs at that point.

Figure 4:
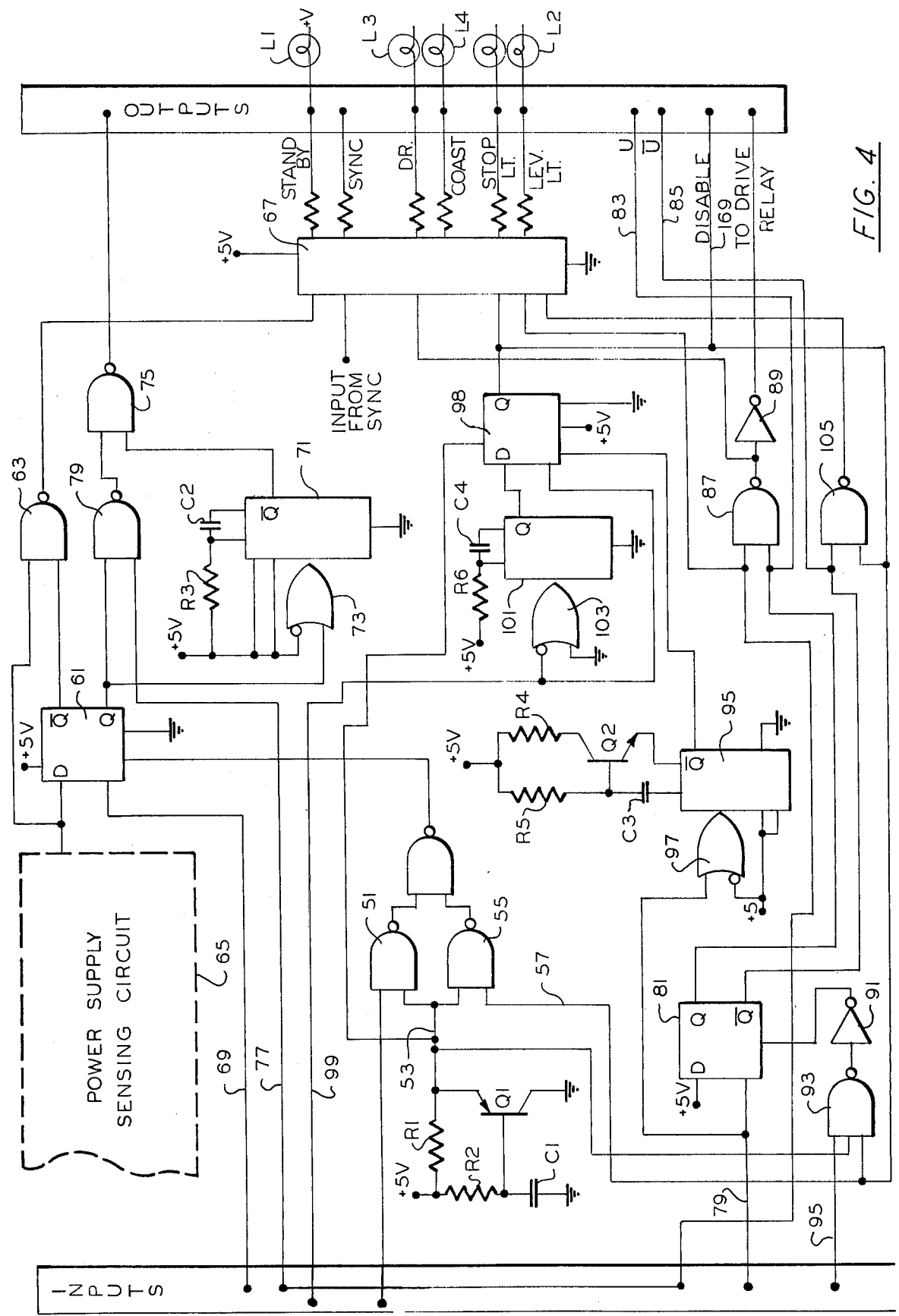
FIG. 4 is a logic diagram showing the front panel logic circuits of FIG. 1.

FIG. 4 shows the logic of block 35 in more detail. In operation, the standby switch is depressed placing a momentary ground or logic 0 at the input of Nand gate 51. As is well known, a Nand gate will have a 1 output except when its both inputs are 1s at which time its output will become 0 with an 0 in on one terminal gate 51 and will no longer have two 1 inputs and will output a 1. Similarly, if a logic 1 is not present on line 53, it will also output a 1. This line is from a delay circuit comprising transistor Q1 resistors R., Ra and capacitor C1. As the voltage comes up, transistor Q1 will keep line 53 at ground until capacitor C1 is charged at which point it will turn off and a logic 1 will be provided to gate 51 and to a gate 55, also a Nand gate. In this manner, appropriate time delay is introduced during application of electrical power to permit initialization of the electronic logic. Gate 55 will have a second 1 input from line 57 indicating a stop condition as will be explained below. Thus, gate 51 will have a 1 output and 55 will have a 0 output. These are inputs to Nand gate 59 which will then have a 0 output since its both inputs are no longer 1s. This is a clear input to flip-flop 61 and will clear the flip-flop, causing its $\overline{Q}$ output to become a 1. This 1 is one input to a Nand gate 63 which has as its second input an output from a power supply sensing circuit 65. If all supplies are operating properly this output will also be a 1 and gate 63 will have a 0 output. This is provided to a lamp driver circuit 67 which will provide an output to turn on a standby lamp L1. In each case a low or 0 input results in a low output to turn on an associated lamp by grounding it.

Next, the levitation switch is closed to provide an input on line 69. This is the clock input to flip-flop 61 which is a D type flip-flop. In this type flip-flop, a clock input will cause the D input to be transferred to the Q output. The D input to flip-flop 61 is a logic 1 from circuit 65. Thus, the Q output of flip-flop 61 will become a 1. This is the input to a one shot 71 having an external resistor R3 and capacitor C2 setting its pulse length. Its input is through an associated gate 73. In response to the Q output of flip-flop 61, one shot 71 fires, causing its $\overline{Q}$ output to go to 0. At Nand gate 75, which previously had two 1s at its input, this 0 will cause an output of 1. This output is provided to a relay driver to activate the levitation apparatus of FIG. 1. If levitation occurs properly, an input on line 77 indicative thereof will occur. This 1 input is provided to Nand gate 79 which has a second 1 as an input from flip-flop 61. Thus gate 79 will have a 0 output causing the output of gate 75 to remain at 1 even after the end of the pulse from one shot 71. If levitation does not properly occur, by the end of that pulse the output of gate 75 will return to 0. Lack of levitation is indicated by lamp L2 which is driven by line 77 through driver 67.

Assuming proper levitation, the motor may now be brought up to speed. Direction of rotation is selected and provided as an input to the drive logic to be described below. The drive switch is then closed, resulting in an input on line 79. This is the clock input to D type flip-flop 81 which has a logic 1 at its D input. Its Q output, which is the logic signal u described above, will thus become 1. Its $\overline{Q}$ output is $\overline{u}$. The u and $\overline{u}$ outputs are provided as outputs on lines 83 and 85 to the drive logic.

The u signal and the levitation signal on line 77 are inputs to a Nand gate 87. If levitation has occurred and drive is initiated by setting flip-flop 81, a 0 output from gate 87 will, through driver 67, light the drive lamp L3. This 0 is also inverted through an inverter 89, the output of which is used to activate a drive relay which applies power to the drivers 47 of FIG. 1.

Flip flop 81 will be cleared by an 0 at its clear input. Its clear input is coupled to the output of an inverter 91. Thus, whenever inverter 91 has an 0 input, flip flop 81 will be cleared. Inverter 91 is driven by Nand gate 93. Nand gate 93 will have a 1 output except when all of its inputs are 1s. One input is from transistor Q1 and normally will be a 1; its second input is from line 95 coupled to the coast switch which is also normally a 1 except when operated. Its third input is from flip flop 97 which is the stop flip flop. Flip-flop 97, as will be described below, will have a Q output at 1 when the rotor is running and 0 when stopped. When starting, it will thus have an 0 input. This will cause gate 93 to have a 1 output which when inverted in inverter 91, will maintain flip flop 81 in a cleared state, preventing startup. To overcome this problem, the drive line 79 is provided as an input to a one shot 95 with transistor Q2, resistors R4 and R5 and capacitor C3 in its external time delay circuit. Its input is buffered through gate 97. When a 1 appears on line 79, one shot 95 will be fired and its Q output will go to 0 to preset the Q output of flip flop 97 to a 1. This will remove the clear signal from flip flop 81 allowing it to be set to start the drive. Once the rotor is moving, an input on line 99 which is at a frequency of 24 times the rate of rotation will appear. This is provided at the clock input to flip flop 97 and as the input to a one shot 101 having an external resistor R6 and capacitor C4. Its input is through a gate 103. As long as rotor speed is significant, the clock input will occur during the time the Q output of one shot 101 is present. However, as speed approaches zero, the time between clock transitions will be longer than the pulse from one shot 101 and a 0 will be at the D input when the clock occurs causing the flipflop 97 to be reset and its Q output to become 0.

Thus, when starting up this speed sensing circuit is overrridden by the preset output from one shot 95. Once the rotor is turning, flipflop 97 will remain set as described above.

When it is desired to coast down the coast switch is operated to place a 0 on line 95. This will clear flip-flop 81 causing its $\overline{Q}$ output $\overline{u}$ to become 1. Q will become 0 and the drive relay will be deactivated and drive light L3 extinguished. Since the rotor is still spinning, the Q output of flipflop 97 will still be 1. This and the $\overline{Q}$ output of flipflop 81 are the inputs to NAND gate 105 which will thus have an 0 output. This 0 will through driver 67 cause the coast lamp L4 to light. When near zero, speed is reached, the above described sequence will take place to reset flipflop 97. When its Q output becomes 0, stop lamp L5 will be lighted through drive 67, coast lamp L4 extinguished because of the 0 at the input to gate 105, and flipflop 61 cleared because of the 0 at gate 55. This last will case the levitate relay to be deactivated turning off the levitation system.

The motor may also be driven down. In that case, direction of rotation is reversed as will be described below and acceleration in the opposite direction occurs. Flipflops 81 and 97 remain set until zero speed is reached at which time they are cleared or reset as described above, i.e., the 0 from flip-flop 97 now also clears flipflop 81 through gate 93. The 0 output of flipflop 87 which is 1 when in a drive condition is provided as a disable output on line 107. This output will be a 0 during stop.

Figure 5:
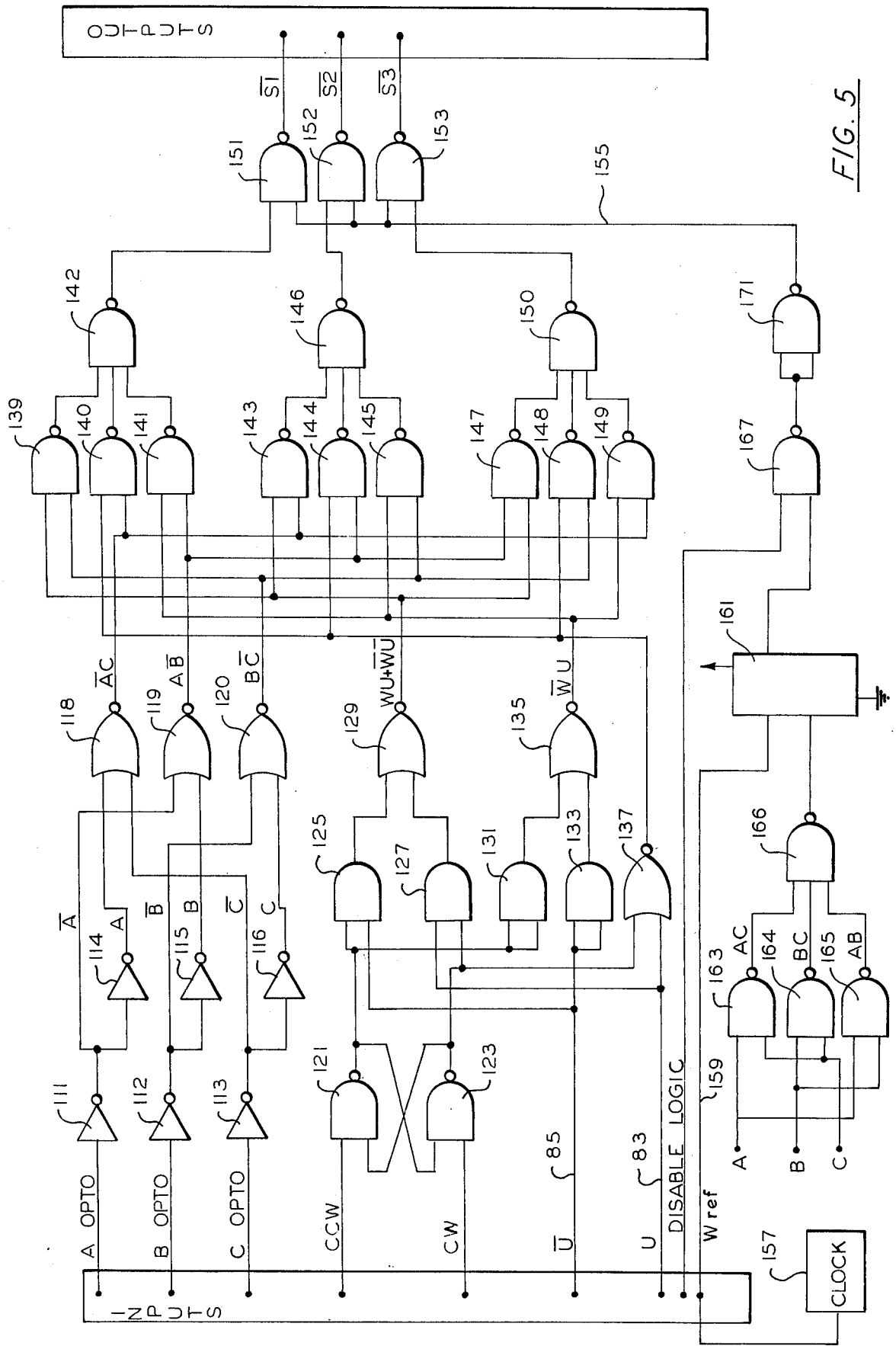
FIG. 5 is a logic diagram showing the rotor control logic.

The drive logic which activates the rotor segments in the above described sequence is shown on FIG. 5. Therein are developed the signals S1, S2 and S3. The A, B and C inputs from sensors 33 are provided respectively to buffer inverts 111, 112 and 113. These will have respective outputs $\overline{A}$, $\overline{B}$ and $\overline{C}$. The outputs are again inverted through inverters 114, 115 and 116 to obtain A, B and C. The six outputs are combined in NOR gates 118, 119 and 120 to obtain as respective outputs $\overline{AC}$, $\overline{AB}$ and $\overline{BC}$. A NOR gate will have a 1 output only when both inputs are 0. Thus, gate 118 has as inputs A and $\overline{C}$. Only when A and $\overline{C}$ are 0, i.e., when the condition $\overline{A}C$ exists, will gate 118 have an output. The gates 119 and 120 are coupled in similar fashion. The CW and CCW inputs of switch S3 of FIG. 1 are the respective set and reset inputs to a flipflop made up of cross coupled NOR gates 121 and 123. The outputs are designated W and $\overline{W}$ with W indicating CCW rotation as described above. These outputs are combined with the inputs $\overline{U}$ and U on lines 85 and 83 from FIG. 4 to develop $WU+\overline{WU}$, $\overline{W}U$ and $W\overline{U}$. W and $\overline{U}$ are Anded in AND gate 125 to obtain $W\overline{U}$ and $\overline{W}$ and u Anded in AND gate 127 to obtain $\overline{W}u$. The outputs of gate 125 and 127 are inputs to NOR gate 129. It will have a 1 output when both its inputs are 0. Such will occur when one or both inputs of each AND gate 125 and 127 is 0, i.e., when the conditions $(W\overline{U}+\overline{U}\overline{W})$ $(\overline{W}U+\overline{W}\overline{U})$ are present. This reduces to $WU+\overline{WU}$, the desired output. W is provided as both inputs to AND gate 131 and $\overline{u}$ to AND gate 133. These gates are used only to standardize logic and perform logic functions W and U from gates 131 and 133 are the inputs to NOR gate 135. Only when both are 0, i.e., the condition $\overline{W}$ and u, will gate 135 have an 1 output. Similarly, u and $\overline{W}$ are combined in NOR gate 137 to provide a 1 output for the condition $\overline{WU}$.

The quantities $\overline{AC}$, $\overline{AB}$, $\overline{BC}$, $WU+\overline{WU}$, $\overline{W}U$ AND $W\overline{U}$ are then combined in NAND gates 139 through 150 in accordance with the above equations to obtain S1, S2 and S3. For example, gate 139 has as inputs $WU+\overline{WU}$ and $\overline{BC}$: gate 140 $\overline{W}U$ and $\overline{AC}$ and gate 141, $W\overline{U}$ and $\overline{AB}$. The respective outputs of gates 139, 140 and 141 will be (WU+$\overline{WU}$) $\overline{BC}$, ($\overline{U}$ W)$\overline{AC}$ and ($\overline{WU}$) $\overline{AB}$. These are inputs to NAND gate 142. NAND gate 142 will have a 1 output except when all its inputs are 1s. In other words, if any input is 0, it will have a 1 output. Its first input (UW+$\overline{WU}$) $\overline{BC}$ will be 0 for (UW+$\overline{WU}$) BC, its second for ($\overline{UW}$) AC and its third for ($\overline{WU}$) AB. Thus, the output of gate 142 will be (UW+$\overline{WU}$) BC + ($\overline{UW}$) AC + ($\overline{WU}$) AB = S1 as defined above. Similarly, gates 146 and 150 provide outputs corresponding to S2 and S3. These outputs are provided respectively to NAND gates 151, 152 and 153 which have as a second input an enabling signal on line 155. Assuming the enabling signal is present, these gates will invert the respective S1, S2 and S3 outputs to obtain $\overline{S1}$, $\overline{S2}$ and $\overline{S3}$ to be used in the drivers 47 of FIG. 1 to be described below, i.e., the drivers respond to the lower inverted signal.

The output on line 155 not only acts to disable the outputs $\overline{S1}$, $\overline{S2}$ and $\overline{S3}$ but also to control their duration thereby controlling the length of application of voltage to the segments and thus torque. In this way, a proper speed is maintained. A reference pulse train representing a desired speed Wref is provided from a clock 157 on line 159. This is one input to a frequency and phase comparator 161. The outputs A B and C from inverters 114, 115 and 116 are combined as shown in NAND gates 163, 164, 165 and 166 to obtain AC + BC + AB = W. From an examination of FIG. 3, this will be seen to represent a pulse every 7.5° of rotation. Thus, for a desired speed of 180,000 rpm, for example, $$Wref = \frac{360°}{7.5} \times \frac{180,000 \text{ rpm}}{60 S/m} = 144 \text{ KHz}$$

The values W and Wref are compared in frequency comparator 161. Its output is one input to Nand gate 167 which has as a second input the disable output on line 169 from FIG. 4. During drive this output will be a 1. Thus, with a 1 from comparator 161 gate 167 will have a 0 output. When inverted through Nand gate 171 this will result in a 1 on line 155 enabling gates 151–153. As the rotor reaches the desired speed, rather than outputting a constant 1, comparator 161 will output a pulse of lesser width. Thus, the output $\overline{S1}$, $\overline{S2}$ and $\overline{S3}$ will appear only for a duration which permits maintaining the desired speed.

Figure 6:
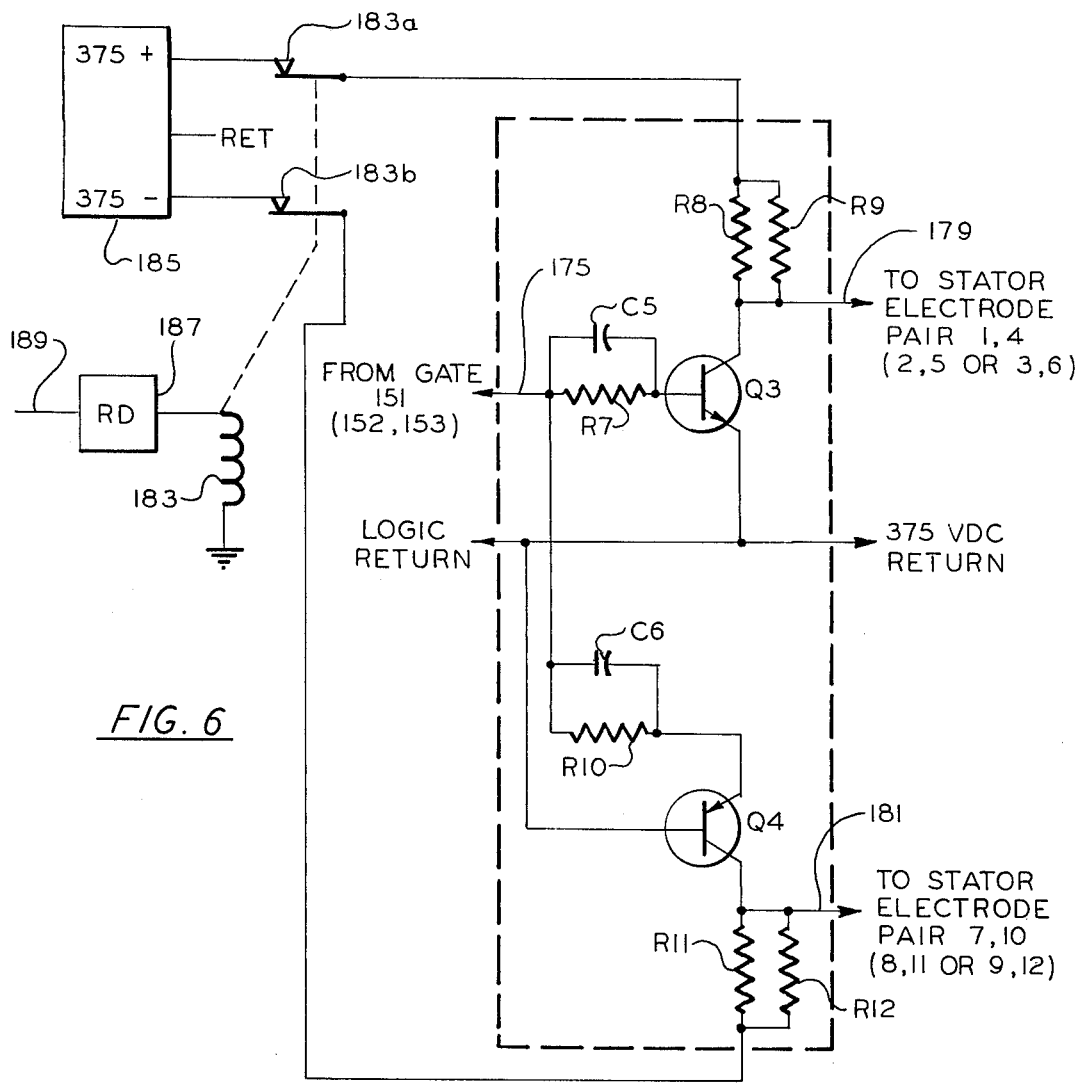
FIG. 6 is a schematic diagram of a driver circuit such as that shown in block diagram form on FIG. 1.

FIG. 6 illustrates a typical driver 47 of which three are provided as shown on FIG. 1. An input from one of gates 151–153 of FIG. 5 is provided on line 175. Assume line 175 coupled to gate 151. When S1 is present at gate 151 along with the enabling signal of line 155, line 175 will be 0 or low. Line 175 is coupled through a resistor R7 and capacitor C5, in parallel to the base of a transistor Q3. Transistor Q5 has its emitter coupled to the 375 V return and its collector through parallel resistors R8 and R9 to +375 volts, for example. Line 175 is also coupled through resistor R10 and capacitor CG in parallel to the emitter of transistor Q4 which has its base coupled to the logic return and 375 V return and its collector coupled through resistors R11 and R12 to −375 V DC. The voltages of ± 375 V are used only as an example. Other voltages of equal magnitude and opposite polarity may also be used. A lower 0 on line 175 will result in the emitters and bases of Q3 and of Q4 to be at essentially equal potentials causing them to turn off. Thus, at line 179 from the collector of Q3 + 375 V will be provided to electrodes 1 and 4. And −375 V will be provided on line 181 from the collector of Q4 to electrodes 7 and 10. When S1 becomes 0, $\overline{S1}$ on line 175 will become 1. Now both transistors will be forwarded biased and will turn on, grounding lines 179 and 181 through the conducting transistors to remove the potential therefrom.

Also shown on FIG. 6 is the drive relay 183 having contacts 183a and 183b coupling the voltages from power supply 185 to transistors Q3 and Q4. The relay 183 is driven relay driver 187, e.g., a transistor switch, having an input on line 189 from inverter 89 of FIG. 1. Typical components for use in the circuits of the present invention are as follows:

| | |
|---|---|
| Driver 67 | Texas Inst 7417 |
| 2 Input Nand gates | Texas Inst 7400 |
| 2 Input Nor gates | Texas Inst 7402 |
| 3 Input Nand gates | Texas Inst 7410 |
| 4 Input Nand gates | Texas Inst 7400 |
| Inverters | Texas Inst 7404 |
| And gates | Texas Inst 7451 |
| D type flip-flops | Texas Inst 7474 |
| One shots and associated gates | Texas Inst 9602 |
| Q1, Q2 | 2 N 3906 |
| R 1 | 20 K |
| R 2 | 270 K |
| C 1 | .470 uf |
| R 3 | 39 k |
| C 2 | .33 uf |
| R 4 | 50 k |
| R 5 | 3.3 m |
| C 3 | 75 uf |
| R 6 | 50 k |
| C 4 | 75 uf |
| R 7 | 68 k |
| R8, R9, R11, R12 | 680 k |
| R 10 | 2.7 k |
| C 5 | 470 pf |
| C 6 | 3900 pf |
| Q 3, | Industro TRS 40S |
| Q 4, | Industro TRSP 40S |

Figure 7:
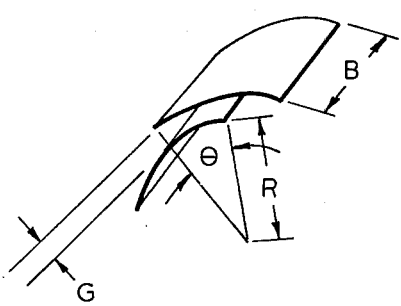
FIG. 7 is a perspective diagram, helpful in understanding the manner in which torque is developed electrostatically.

An example of a motor and the torque which may be developed will now be given. For N active electrodes at a potential V with respect to the rotor segment, the energy stored in the gap G as illustrated on FIG. 7 is:

$$U = \tfrac{1}{2} CV^2.$$

Where V is the voltage across the gap and C the capacitance. Differentiating with respect to $\theta$ to obtain torque, $$T = N \frac{dU}{d\theta} = \frac{NV^2}{2} \frac{\delta C}{\delta \theta} + NCV \frac{\delta V}{\delta \theta}$$

$$\text{for } \frac{\delta V}{\delta \theta} = O \text{ and } C = \frac{Ke_o R\theta B}{G};$$

where R is the radius $\theta$ the angle of overlap and B the width, K is the dielectric constant and $e_o$ the dielectric permitivity in a vacuum. Note that $R\theta B$ is equal to the plate area.

A typical ESG rotor has the following dimensions:
$R = 11.6 \times 10^{-3}$ m
$B = 5.95 \times 10^{-3}$ m
With a gap of 3 mils,
$G = 76.2 \times 10^{-6}$ m
For 4 electrodes,
$N = 4$
and for vacuum, $k = 1$, and:

$$E_o = 8.85 \times 10^{-12} \frac{(\text{coul}^2)}{(\text{joule} - m)}$$

$$T = 16 \times 10^{-12} \frac{\text{joules}}{\text{volt}^2}$$

A conservative design for the electrode driver using available high-voltage switching transistors would use a ± 280V supply. Thus,
$$T_{max} = 12.5 \times 10^{-7} \text{ joules} = 12.5 \text{ dyne-cm}$$
The moment of intertia of the rotor is,
$$J = 5.23 \times 10^{-8} \text{ kg-m}^2$$
These values produce an angular acceleration of, $$\frac{12.5 \times 10^{-7}}{5.23 \times 10^{-8}} = 24 \text{ rad/sec}^2$$

Thus, the spin-up or spin-down time, full speed of 180,000 rpm is, $$t = \frac{180 \times 10^3 \times 6.28}{60 \times 24} = 780 \text{ sec}$$

or about 13 minutes.

Thus, an improved electrostatic motor for use in electrostatic gyros has been shown. Although a specific embodiment has been illustrated and described, it will be obvious to those skilled in the art that various modifications may be made without departing from the spirit of the invention which is intended to be limited solely by the appended claims.

What is claimed is:

1. An electrostatic motor arrangement comprising:
   a. a rotor made up of conductor segments, each segment subtending an angle of approximately 360°/2n;
   b. means electrically coupling all said segments together;
   c. a stator made up of m conductive segments each subtending an angle of slightly less than 360°/m so that each segment is electrically isolated from the other;
   d. a plurality of electro-optical pickoffs arranged at gaps between said stator elements and adapted to sense the presence of a rotor segment, radial passing through said gap whereby said pick-offs will output a pulse train as said rotor rotates with respect to said stator to sense the position of said rotor segments relative to said stator segments and to provide an output indicative thereof;
   e. means for energizing opposite pairs of said stator segments with a D.C. potential, said means being responsive to said output;
   f. means to generate a reference pulse train; and
   g. a frequency and phase comparator having as inputs said reference pulse train and a pulse train which is a function of the pulse train output by said electro-optical pick-offs for comparing the angular rate of the rotor with respect to the stator with a predetermined angular rate, said frequency and phase comparator providing an output to said means to energize, said means to energize being further adapted to be responsive to said output to energize said stator so as to just maintain said angular rate.

2. The motor arrangement according to claim 1 and further including means to select a direction of rotation.

3. The invention according to claim 2 and further including means to select one of spin up and spin down.

4. The invention according to claim 1 and further including means to sense a condition of approximately zero relative angular rotation between said rotor and stator and to provide a disabling output to said means for energizing in response thereto.

5. The invention according to claim 4 wherein said means for sensing a condition where said relative angular rate is approximately zero comprises means having said pulse train as an input.

6. The invention according to claim 5 wherein said means comprises a one-shot multivibrator triggered by said pulse train and a B type flipflop having its clock input coupled to said pulse train and its D input coupled to an output of said one shot whereby as long as said rotor is spinning at a speed with respect to said stator which is not approximately zero, clock transitions will appear at said B type flipflop during the time period of a pulse out of said one-shot, but at speeds approaching zero, the output of said one-shot will not be at the input when said clock transition occurs, thereby causing said D flipflop to change its output state, thereby giving an indication of a stop condition.

7. The invention according to claim 6 wherein said motor has a levitating system associated therewith and further including means to inhibit said means for energizing unless an indication of levitation is present.

8. The invention according to claim 7 wherein said energizing means comprise a logic circuit having said pulse trains as inputs and providing a plurality of outputs, each representing the energization of different pairs of stator segments and a plurality of driver circuits responsive to said logic outputs to couple high voltages of equal magnitude and opposite polarity to pairs of said stator segments.

9. The invention according to claim 8 wherein said rotor is made up of eight segments, said stator of 12 segments, three electro-optical pickoffs arranged adjacent gaps are provided and further including means to select direction of rotation with the logic symbol W indicating counterclock-wise rotation and means to select spinup or spin down with the logic symbol U indicating spin-up, the respective outputs of said electro-optical pickoffs being designated A, B and C, the outputs of said logic circuit being designated S1, S2 and S3 and wherein said logic circuit solves the following logic equations:
$$S1 = (WU+\overline{WU}) \cdot BC + W\overline{U} \cdot \overline{A}C + \overline{W}U \cdot A\overline{B}$$
$$S2 = (WU+\overline{WU}) \cdot \overline{A}C + W\overline{U} \cdot A\overline{B} + \overline{W}U \cdot B\overline{C}$$
$$S3 = (WU+\overline{WU}) \cdot A\overline{B} + W\overline{U} \cdot B\overline{C} + \overline{W}U \cdot \overline{A}C$$

10. The invention according to claim 9 wherein said quantity U is developed in response to an input means which may be operated to select one of a spin up and spin down condition, with the output U being provided in response to selection of a spin up condition and the output $\overline{U}$ in response to the selection of a spin down condition.

11. The invention according to claim 10 wherein the inputs to said frequency phase comparator comprise a reference input from a clock and an actual rotation speed input developed from logic means summing groups of the outputs of said electrooptical pick-offs.

12. The invention according to claim 11 wherein said logic means provide an output in accordance with the following equations:
$$S1 = (WU+\overline{WU}) \cdot BC + W\overline{U} \cdot \overline{A}C + \overline{W}U \cdot A\overline{B}$$
$$S2 = (WU+\overline{WU}) \cdot \overline{A}C + W\overline{U} \cdot A\overline{B} + \overline{W}U \cdot B\overline{C}$$
$$S3 = (WU+\overline{WU}) \cdot A\overline{B} + W\overline{U} \cdot B\overline{C} + \overline{W}U \cdot \overline{A}C$$

13. The invention according to claim 12 wherein said driving means are responsive to the inverse of said signals S1, S2 and S3 and further including gating means associated with each of said outputs S1, S2 and S3 to provide outputs $\overline{S1}$, $\overline{S2}$ and $\overline{S3}$ in response to the presence of a respective associated input S1, S2 and S3 and at the same time an input from said frequency comparison means whereby by providing an output from said frequency comparison means which is a pulse length related to the difference in speed, said driving means will energize said stator segments, only for a time such that the difference between said actual and desired speed is controlled to a steady-state zero average value.

14. The invention according to claim 1 wherein said rotor segments and said coupling means comprise conductive areas on a non-conductive base.

15. The invention according to claim 1 wherein said rotor segments coupling means comprise raised areas on a conductive rotor base with pockets formed in said base between said raised areas.

* * * * *